United States Patent
Chun et al.

(10) Patent No.: US 11,595,581 B2
(45) Date of Patent: Feb. 28, 2023

(54) ACTUATOR OF CAMERA MODULE

(71) Applicant: Samsung Electro-Mechanics Co., Ltd., Suwon-si (KR)

(72) Inventors: Ji Buem Chun, Suwon-si (KR); Ji Hwan Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 424 days.

(21) Appl. No.: 16/936,984

(22) Filed: Jul. 23, 2020

(65) Prior Publication Data

US 2021/0266463 A1    Aug. 26, 2021

(30) Foreign Application Priority Data

Feb. 25, 2020    (KR) .................. 10-2020-0023119

(51) Int. Cl.
   *H04N 5/232*    (2006.01)
   *H02K 41/035*    (2006.01)
   *G03B 13/36*    (2021.01)
   *G02B 27/64*    (2006.01)
   (Continued)

(52) U.S. Cl.
   CPC .......... *H04N 5/23287* (2013.01); *G02B 7/09* (2013.01); *G02B 27/646* (2013.01); *G03B 13/36* (2013.01); *G05B 11/36* (2013.01); *H02K 41/0354* (2013.01); *G03B 2205/0069* (2013.01)

(58) Field of Classification Search
   CPC .......... H04N 5/23248; H04N 5/23264; H04N 5/2328; H04N 5/23287; G02B 27/646; G02B 27/64; G02B 27/644; G02B 27/648; G02B 7/04; G02B 7/09; G03B 2205/0007; G03B 2205/0015; G03B 2205/0038; G03B 2205/0046; G03B 2205/0053; G03B 2205/0069; G03B 13/32; G03B 13/34; G03B 13/36; G05B 11/36; G05B 11/42; H02K 41/0354; H02K 41/0356
   See application file for complete search history.

(56) References Cited

U.S. PATENT DOCUMENTS

2016/0315573 A1    10/2016  Kang
2018/0278853 A1*    9/2018  Ryu ................. H04N 5/243

FOREIGN PATENT DOCUMENTS

JP    2014-204478 A    10/2014
KR    10-2016-0126915 A    11/2016
KR    10-2018-0029838 A    3/2018

\* cited by examiner

*Primary Examiner* — Clayton E. LaBalle
*Assistant Examiner* — Fang-Chi Chang
(74) *Attorney, Agent, or Firm* — NSIP Law

(57) ABSTRACT

A camera module actuator includes: a magnet disposed on a lens barrel; a driving coil disposed opposite to the magnet; and a driving device including a comparer that calculates an error value by comparing a target position of the lens barrel with a current position of the lens barrel, a controller IC that generates a control signal by applying control gains to the error value, and a driving circuit that generates a driving signal in response to the control signal. The controller IC determines the control gains based on a friction coefficient between a guide groove guiding movement of the lens barrel and a ball bearing contacting the guide groove. The controller IC provides a detection signal having a gradually increasing level to the driving coil, and determines the friction coefficient based on a level of the detection signal at a point in time of movement of the lens barrel.

18 Claims, 3 Drawing Sheets

(51) Int. Cl.
*G05B 11/36* (2006.01)
*G02B 7/09* (2021.01)

ACTUATOR OF CAMERA MODULE

CROSS-REFERENCE TO RELATED APPLICATION(S)

This application claims the benefit under 35 USC 119(a) of Korean Patent Application No. 10-2020-0023119 filed on Feb. 25, 2020 in the Korean Intellectual Property Office, the entire disclosure of which is incorporated herein by reference for all purposes.

BACKGROUND

1. Field

The following description relates to an actuator of a camera module.

2. Description of Related Art

In general, portable communication terminals, such as mobile phones, PDAs, portable PCs, and the like, have recently been generalized to perform not only the transmission of text or voice data, but also the transmission of video data. In response to this trend, to be able to transmit video data or video chat, a camera module is installed in a portable communication terminal.

In general, the camera module includes a lens barrel having a lens therein and a housing accommodating the lens barrel therein, and further includes an image sensor configured to convert an image of a subject into an electrical signal. The camera module may be a single-focus camera module that images an object with a fixed focus. However, recently, a camera module including an actuator capable of autofocusing (AF) adjustment has been implemented in portable communication terminals. In addition, the camera module employs an actuator for optical image stabilization (OIS) to reduce the resolution degradation caused by shaking.

To precisely control an autofocusing function and a shake correction function applied to the camera module, it is necessary to move the lens barrel to a target position. However, the lens barrel may not converge to the target position, and a problem of oscillation may occur.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, an actuator of a camera module includes: a magnet disposed on a lens barrel; a driving coil disposed opposite to the magnet; and a driving device including a comparer configured to calculate an error value by comparing a target position of the lens barrel with a current position of the lens barrel, a controller IC configured to generate a control signal by applying control gains to the error value, and a driving circuit configured to generate a driving signal in response to the control signal. The controller IC is further configured to determine the control gains based on a friction coefficient between a guide groove guiding movement of the lens barrel and a ball bearing contacting the guide groove. The controller IC is further configured to provide a detection signal having a gradually increasing level to the driving coil, and determine the friction coefficient based on a level of the detection signal at a point in time of movement of the lens barrel.

The control gains may be provided by a PID controller.

The controller IC may be further configured to increase the control gains in response to the friction coefficient being greater than a reference friction coefficient, and decrease the control gains in response to the friction coefficient being less than the reference friction coefficient.

The controller IC may be further configured to receive a gyro signal including angle information of the guide groove.

The controller IC may be further configured to correct the friction coefficient based on the angle information of the guide groove.

The actuator may further include a position detector including a Hall element configured to detect a position of the lens barrel.

The guide groove and the ball bearing may be configured to have a lubricant applied thereto.

The controller IC may be further configured to model the level of the detection signal at the point in time of movement of the lens barrel, as static friction.

The driving circuit may be further configured to provide the driving signal to the driving coil to perform either one of moving the lens barrel in an optical axis direction for an autofocus function and moving the lens barrel in a direction perpendicular to the optical axis direction for an image stabilization function.

In another general aspect, an actuator of a camera module includes: a magnet disposed on a lens barrel; a driving coil disposed opposite to the magnet; and a driving device including a comparison unit configured to calculate an error value by comparing a target position of the lens barrel with a current position of the lens barrel, a controller IC configured to generate a control signal by applying control gains to the error value, and a driving circuit configured to generate a driving signal in response to the control signal to move the lens barrel to the target position. The controller IC is further configured to determine the control gains based on a friction coefficient between a guide groove guiding movement of the lens barrel and a ball bearing contacting the guide groove. The controller IC is further configured to provide a detection signal to the driving coil, and model a level of the detection signal at a point in time of movement of the lens barrel, as a static friction force, to determine the friction coefficient.

The control gains may be provided by a PID controller.

The controller IC may be further configured to increase the control gains in response to the friction coefficient being greater than a reference friction coefficient, and decrease the control gains in response to the friction coefficient being less than the reference friction coefficient.

The controller IC may be further configured to receive a gyro signal including angle information of the guide groove.

The controller IC may be further configured to correct the friction coefficient based on the angle information of the guide groove.

The actuator may further include a position detector including a Hall element configured to detect a position of the lens barrel.

The guide groove and the ball bearing may be configured to have a lubricant applied thereto.

The detection signal may have a gradually increasing level.

The driving circuit may be further configured to provide the driving signal to the driving coil to perform either one of moving the lens barrel in an optical axis direction for an autofocus function and moving the lens barrel in a direction perpendicular to the optical axis direction for an image stabilization function.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
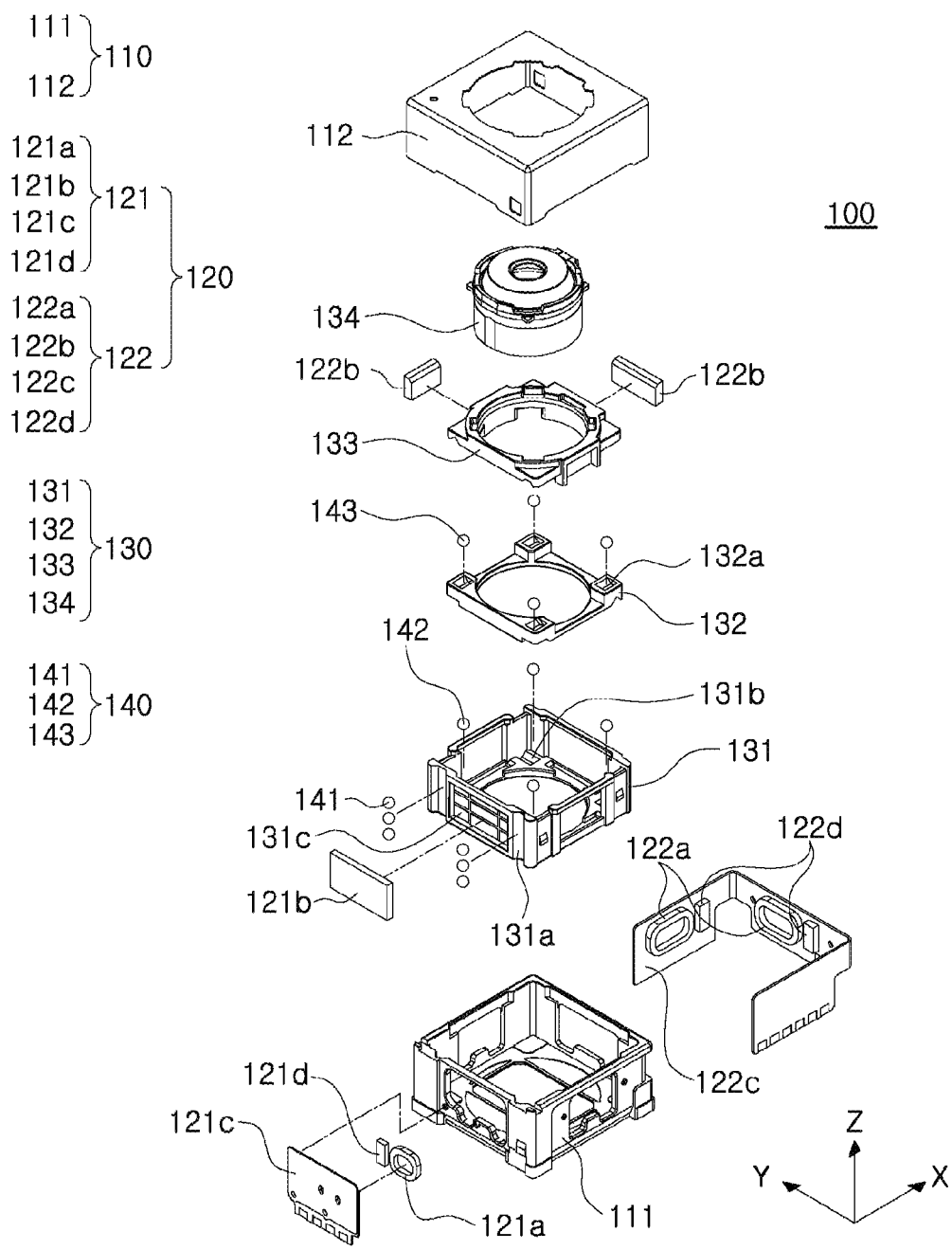
FIG. 1 is an exploded perspective view of a camera module, according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 is an exploded perspective view of a camera module 100, according to an example.

Referring to FIG. 1, the camera module 100 may include, for example, a housing unit 110, an actuator 120, and a lens module 130, and may further include a ball bearing unit 140.

The camera module 100 may include either one or both of an autofocusing function and an optical image stabilization function. For example, the camera module 100 may drive the lens module 130 in an optical axis direction (e.g. a Z-axis direction) and a direction perpendicular to the optical axis direction (e.g. X-axis and Y-axis directions), respectively, in the interior of the housing unit 110 to perform an autofocusing function and an optical image stabilization function.

The housing unit 110 may include a housing 111 and a shield case 112. The housing 111 may be formed of a material that is easily molded. For example, the housing 111 may be formed of a plastic material. The housing 111 may be equipped with at least one actuator 120.

For example, the actuator 120 may include a first actuator 121 and a second actuator 122. A portion of the first actuator 121 may be mounted on a first side of the housing 111, and a portion of the second actuator 122 may be mounted on second and third sides of the housing 111.

The housing 111 is configured to receive the lens module 130 therein. For example, a space in which the lens module 130 may be completely or partially accommodated is formed inside the housing 111.

The housing 111 may have, for example, a six-sided open shape. For example, a hole for an image sensor may be formed in a lower surface of the housing 111, and a quadrangular hole in which the lens module 130 is to be formed may be formed in an upper surface of the housing 111.

The first side of the housing 111 may be open in such a manner that a first driving coil 121a of the first actuator 121 may be inserted therein, and the second and third sides of the housing 111 may be open in such a manner that second driving coils 122a of the second actuator 122 may be inserted therein.

The shield case 112 is configured to cover a portion of the housing 111. For example, the shield case 112 may be configured to cover the upper surface and four sides of the housing 111. Alternatively, the shield case 112 may be configured to cover only four sides of the housing 111, or the shield case 112 may be configured to partially cover the upper surface and the four sides of the housing 111.

The shield case 112 may shield electromagnetic waves generated during driving of the camera module 100. When the camera module 100 is driven, electromagnetic waves are generated, and in a case in which electromagnetic waves are emitted externally, the electromagnetic waves may affect other electronic components, causing communication failure or malfunction. To prevent such failure or malfunction, the shield case 112 is formed of a metal material and is grounded to a ground pad of a substrate mounted on a lower portion of the housing 111 to shield electromagnetic waves.

For example, the first actuator 121 may drive the lens module 130 in the Z-axis direction, and the second actuator 122 may drive the lens module 130 in the X-axis direction and the Y-axis direction.

The first actuator 121 may be mounted on the housing 111 and a first frame 131 of the lens module 130. For example, a portion of the first actuator 121 may be mounted on the first side of the housing 111, and the remaining portion of the first actuator 121 may be mounted on a first side of the first frame 131.

The first actuator 121 may move the lens module 130 in the optical axis direction (the Z-axis direction). For example, the first actuator 121 may include the first driving coil 121a, a first magnet 121b, a first substrate 121c, and a first position detection element 121d.

The first driving coil 121a and the first position detection element 121d are formed on the first substrate 121c. The first substrate 121c is mounted on the first side of the housing 111, and the first magnet 121b is mounted on a first side 131c of the first frame 131 facing the first substrate 121c.

A first driver that provides a driving signal to the first driving coil 121a may be disposed on the first substrate 121c. The first driver may provide driving force to the first magnet 121b by applying a driving signal to the first driving coil 121a. For example, when a driving signal from the first driver is provided to the first driving coil 121a, magnetic flux is generated in the first driving coil 121a, and the magnetic flux generated in the first driving coil 121a interacts with a magnetic field of the first magnet 121b, to generate driving force that enables relative movement of the first frame 131 and a lens barrel 134 with respect to the housing 111.

The first driver may include an H-bridge circuit capable of bidirectional driving in the first driver, to apply a driving signal to the first driving coil 121a.

The lens barrel 134 may move in the same direction as the first frame 131 by the movement of the first frame 131. The first actuator 121 may detect the intensity of a magnetic field of the first magnet 121b, using the first position detection element 121d, to detect positions of the first frame 131 and the lens barrel 134. As an example, the first position detection element 121d may include a Hall element.

The second actuator 122 may be mounted on the housing 111 and a third frame 133 of the lens module 130. For example, a portion of the second actuator 122 may be mounted on the second and third sides of the housing 111, and the remaining portion of the second actuator 122 may be mounted on second and third sides of the third frame 133.

The second actuator 122 includes elements configured to move the lens module 130 in a direction perpendicular to the optical axis. For example, the second actuator 122 may include a plurality of second driving coils 122a, a plurality of second magnets 122b, a second substrate 122c, and a second position detection element 122d.

The plurality of second driving coils 122a and the second position detection element 122d are formed on the second substrate 122c. The second substrate 122c may have a substantially quadrangular form, of which one side is open, and, for example, is mounted in a form surrounding the second to fourth sides of the housing 111. The plurality of second magnets 122b are mounted on the second and third sides of the third frame 133 to face the second substrates 122c, respectively.

A second driver configured to provide a driving signal to the second driving coil 122a may be disposed on the second substrate 122c. The second driver may provide driving force to the second magnet 122b by applying a driving signal to the second driving coil 122a. When the driving signal from the second driver is provided to the second driving coil 122a, magnetic flux is generated in the second driving coil 122a, and the magnetic flux generated from the second driving coil 122a interacts with a magnetic field of the second magnet 122b. The second driver changes the magnitude and direction of the magnetic force generated between the plurality of second driving coils 122a and the plurality of second magnets 122b, to enable the relative movement of a second frame 132 or the third frame 133 with respect to the first frame 131.

The second driver may include an H bridge circuit capable of bidirectional driving in the second driver, to apply a driving signal to the second driving coil 122a.

The lens barrel 134 may move in the same direction as the second frame 132 or the third frame 133 by the movement of the second frame 132 or the third frame 133. The second actuator 122 senses the intensity of a magnetic field of the second magnet 122b, using the second position detection element 122d, and thus, may detect the positions of the lens barrel 134, the second frame 132 and the third frame 133.

As an example, the second position detection element 122d may include a Hall element. The second position detection element 122d may include at least two Hall elements to detect the positions of the lens barrel 134 in two directions perpendicular to the optical axis.

The lens module 130 is mounted on the housing unit 110. For example, the lens module 130 is accommodated to be movable in at least three axes in an accommodation space formed by the housing 111 and the shield case 112. The lens module 130 includes a plurality of frames. As an example, the lens module 130 includes the first frame 131, the second frame 132, and the third frame 133.

The first frame 131 is configured to be movable relative to the housing 111. For example, the first frame 131 may be moved in the optical axis direction (the Z-axis direction) of the housing 111 by the first actuator 121. A plurality of guide grooves 131a and 131b are formed in the first frame 131. For example, the first guide groove 131a extends in the optical axis direction (the Z-axis direction) and is formed in a first side of the first frame 131, and the second guide grooves 131b extend in a first vertical direction (the Y-axis direction) of the optical axis and are respectively formed in four corners of an inner bottom surface of the first frame 131. The first frame 131 is configured to move in the optical axis direction (the Z-axis direction) with respect to the housing 111. For example, the first frame 131 may move in the optical axis direction (the Z-axis direction) along the first guide groove 131a.

The first frame 131 is configured such that at least three sides of the first frame 131 are open. For example, second and third sides of the first frame 131 are open, such that the second driving coil 122a and the second magnet 122b face each other.

The second frame 132 may be mounted on the first frame 131. For example, the second frame 132 may be mounted in an inner space of the first frame 131. The second frame 132 is configured to move in the first direction (the Y-axis direction) perpendicular to the optical axis with respect to the first frame 131. For example, the second frame 132 may move in the first direction (the Y-axis direction) perpendicular to the optical axis along the second guide grooves 131b of the first frame 131.

A plurality of guide grooves 132a are formed in the second frame 132. For example, four third guide grooves 132a extending in a second direction (the X-axis direction) perpendicular to the optical axis are formed at corners of the second frame 132. The third frame 133 is mounted on the second frame 132. For example, the third frame 133 may be mounted on an upper surface of the second frame 132. The third frame 133 is configured to move in the second direction (the X-axis direction) perpendicular to the optical axis with respect to the second frame 132. For example, the third frame 133 may move in the second vertical direction (the X-axis direction) perpendicular to the optical axis along the third guide grooves 132a of the second frame 132. A plurality of second magnets 122b are mounted on the third frame 133. For example, at least two second magnets 122b may be mounted on the second and third sides of the third frame 133, respectively.

The lens barrel 134 may move in the optical axis direction (the Z-axis direction), the first direction (the Y-axis direction) perpendicular to the optical axis, and the second direction (the X-axis direction) perpendicular to the optical axis through the above-described first guide groove 131a, second guide groove 131b, and third guide groove 132a.

The lens module 130 includes the lens barrel 134. For example, the lens barrel 134 may include one or more lenses. The lens barrel 134 may have a hollow cylindrical shape such that one or more lenses for imaging a subject may be accommodated therein, and the lenses may be provided in the lens barrel 134 along the optical axis. The one or more lenses may be stacked in a number designed according to the design of the lens barrel 134, and may have optical properties such as the same or different refractive indices.

The lens barrel 134 is mounted on the third frame 133. For example, the lens barrel 134 is coupled to the third frame 133 and may be integrally moved with the third frame 133.

The lens barrel 134 is configured to move in the optical axis direction (the Z-axis direction) and the first and second directions (the X-axis and Y-axis directions) perpendicular to the optical axis. For example, the lens barrel 134 moves in the optical axis direction (the Z-axis direction) by the first actuator 121 and moves in the first and second directions (the X-axis and Y-axis directions) perpendicular to the optical axis by the second actuator 122.

The ball bearing unit 140 may guide the movement of the lens module 130. For example, the ball bearing unit 140 is configured such that the lens module 130 moves in the optical axis direction and the first and second directions perpendicular to the optical axis. The ball bearing unit 140 may include a first ball bearing 141, a second ball bearing 142, and a third ball bearing 143. As an example, the first ball bearing 141 may be disposed in the first guide groove 131a of the first frame 131, such that the first frame 131 may move in the optical axis direction (the Z-axis direction). As another example, the second ball bearing 142 is disposed in the second guide groove 131b of the first frame 131, such that the second frame 132 may move in the first direction (the Y-axis direction) perpendicular to the optical axis. As another example, the third ball bearing 143 is disposed in the third guide groove 132a of the second frame 132, such that the third frame 133 may move in the second direction (the X-axis direction) perpendicular to the optical axis. Each of the first and second ball bearings 141 and 142 may include at least three balls, and the at least three balls of the ball bearing may be disposed in the first guide groove 131a or the second guide groove 131b.

Lubricant may be filled and applied to the ball bearing unit 140 and the guide groove contacting the ball bearing unit 140. Friction and noise may be reduced by the lubricant. The lubricant may include grease having excellent viscosity and lubricating properties.

Figure 2:
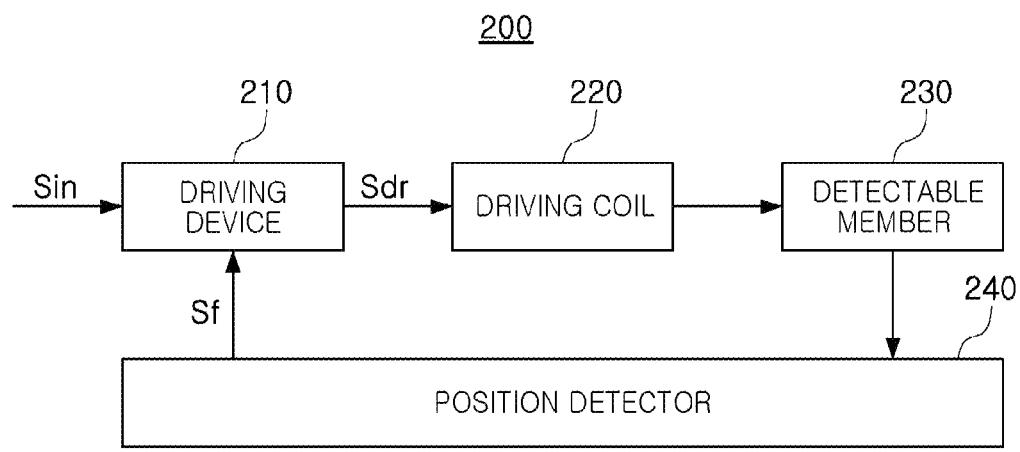
FIG. 2 is a block diagram of a main part of an actuator employed in a camera module, according to an example.

FIG. 2 is a block diagram of a main part of an actuator 220 employed in a camera module, according to an example.

The actuator 200 may include, for example, a driving device 210, a driving coil 220, a detectable member 230, and a position detector 240. The actuator 200 may correspond to either one of the first actuator 121 and the second actuator 122 of FIG. 1.

In an example in which the actuator 200 corresponds to the first actuator 121 of FIG. 1, the actuator 200 may enable the lens barrel to be moved in the optical axis direction (the Z-axis direction), to perform an autofocusing (AF) function of the camera module 100. Accordingly, when the actuator 200 performs an autofocusing function, the driving device 210 may apply a driving signal to the driving coil 220 to provide driving force to the magnet in the optical axis direction (the Z-axis direction).

In addition, in an example in which the actuator 200 corresponds to the second actuator 122 of FIG. 1, the actuator 200 may enable the lens barrel to be moved in a direction (the Y-axis direction or the X-axis direction) perpendicular to the optical axis, to perform the optical image stabilization (OIS) function of the camera module 100. Therefore, when the actuator 200 of FIG. 2 performs the OIS function, the driving device 210 may apply a driving signal to the driving coil 220 to provide, driving force to the magnet in the direction (the Y-axis direction or the X-axis direction) perpendicular to the optical axis.

The driving device 210 generates a driving signal Sdr in response to an input signal Sin input externally and a feedback signal Sf generated from the position detector 240, and may provide the generated driving signal Sdr to the driving coil 220. A target position of the lens barrel 134 of FIG. 1 may be determined by the input signal Sin. For example, the position detector 240 may include a Hall element.

For example, in the case in which the actuator 200 corresponds to the first actuator 121, the input signal Sin may indicate a target position of the lens barrel 134 in the optical axis direction (the Z-axis direction). As another example, in an example in which the actuator 200 corresponds to the second actuator 122, the input signal Sin may indicate a target position of the lens barrel 134 in a direction (the Y-axis direction or the X-axis direction) perpendicular to the optical axis.

When the driving signal Sdr provided from the driving device 210 is applied to the driving coil 220, the lens barrel 134 may move in one direction by electromagnetic interaction between the driving coil 220 and the magnet.

The detectable member 230 may be disposed on one side of the lens barrel 134 to move in the same direction as the moving direction of the lens barrel 134. According to an example, the detectable member 230 may be provided on at least one of a plurality of frames and a carrier coupled to the lens barrel 134, in addition to the lens barrel 134.

The detectable member 230 may include either one of a magnetic body and a conductor. For example, the detectable member 230 may correspond to the first magnet 121b or the second magnet 122b of FIG. 1, and according to an example, an additional element may be provided to implement the detectable member 230.

The position detector 240 detects the position of the detectable member 230 moving along with the lens barrel 134 by electromagnetic interaction between the magnet and the driving coil 220, to generate the feedback signal Sf and provide the feedback signal Sf to the driving device 210.

The position detector 240 may include a position detection element and an analog-to-digital converter. The position detection element of the position detector 240 may correspond to the first position detection element 121d or the second position detection element 122d of FIG. 1. The position detection element may detect the intensity of a magnetic field of the detectable member 230 to detect a position of the lens barrel 134. The analog-to-digital converter may convert an analog signal output from the position detection element into a digital signal.

When the feedback signal Sf is provided to the driving device 210, the driving device 210 may generate the driving signal Sdr again by comparing the input signal Sin with the feedback signal Sf. For example, the driving device 210 may be driven in a closed loop method comparing the input signal Sin and the feedback signal Sf. The closed loop-type driving device 210 may be driven in a direction to reduce an error between a target position included in the input signal Sin and a current position determined by the feedback signal Sf. The closed loop driving method has an advantage of improving linearity, accuracy, and repeatability, as compared to an open loop driving method.

The driving device 210 may include an H-bridge circuit capable of driving in both directions therein to apply a driving signal to the driving coil 220.

Figure 3:
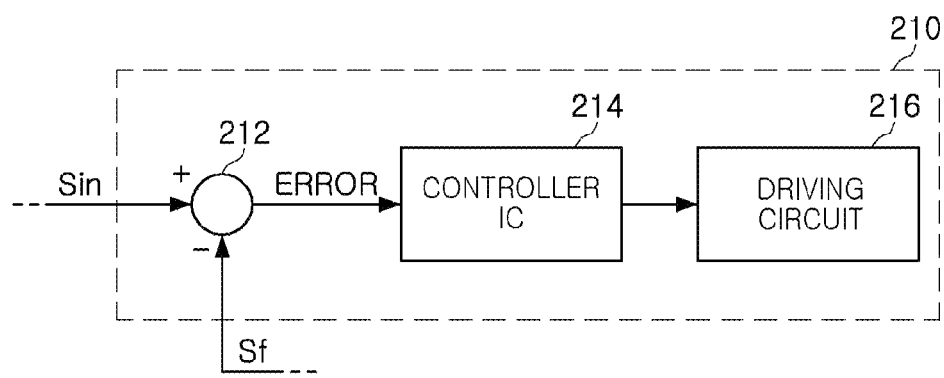
FIG. 3 is a block diagram of a driving device employed in an actuator, according to an example.

FIG. 3 is a block diagram of the driving device 210, according to an example.

The driving device 210 may include, for example, a comparer 212, a controller IC 214, and a driving circuit 216.

The comparer 212 may compare the input signal Sin and the feedback signal Sf. The comparer 212 may calculate an error value ERROR by comparing a target position of the lens barrel 134 included in the input signal Sin with a current position of the lens barrel 134 included in the feedback signal Sf. For example, the comparer 212 may compare the input signal Sin with the feedback signal Sf, and sequentially calculate an error value ERROR. A movement distance and a movement direction of the lens 134 barrel may be determined by the error value ERROR calculated by the comparer 212.

The controller IC 214 may generate a control signal by applying control gains to the error value ERROR provided from the comparison unit 212. As an example, the controller IC 214 may include a Proportional-Integral-Derivative (PID) controller to perform PID control operation. The controller IC 214 may generate a control signal by applying control gains of the PID controller to the error value.

The controller IC 214 may perform a control operation proportional to the magnitude of the error value (ERROR) in the current state according to the proportional control, may perform a control operation to reduce the error in the steady-state according to the integral control, and may perform a control operation to reduce an overshoot by preventing a sudden change according to the derivative control.

The control of the PID controller may be expressed by Equation 1 below. In Equation 1, $K_P$ represents a proportional control gain, $K_I$ represents an integral control gain, $K_D$ represents a derivative control gain, and e(t) represents a function representing a change in an error value (ERROR).

$$u(t) = K_P e(t) + K_I \int e(t)dt + K_D \frac{de(t)}{dt} \qquad \text{Equation 1}$$

The controller IC 214 may generate a control signal by applying the proportional control gain $K_P$, the integral control gain $K_I$, and the derivative control gain $K_D$ to the error value ERROR corresponding to a difference between the target position of the lens barrel and the current position of the lens barrel 134, when performing PID control operation.

The driving circuit 216 may generate a driving signal in response to a control signal provided from the controller IC 214. The lens barrel 134 may move to a target position by a driving signal generated by the driving circuit 216. The driving circuit 216 may include an H-bridge circuit capable of bidirectional driving therein to apply a driving signal to the driving coil 220 in a voice coil motor method. The driving signal may be provided to the driving coil 220 in the form of current or voltage.

When the driving circuit 216 is driven by the voice coil motor method, the control signal provided from the controller IC 214 may be applied to a control terminal of a transistor element constituting the H bridge circuit.

However, even in the case in which a control signal is generated by applying control gains, a problem in which the lens barrel 134 does not converge to a target position and oscillates may occur. In this case, the oscillation is a state in which the lens barrel 134 does not enter the steady state even after the settling time has elapsed, and the overshoot or undershoot occurs continuously.

For example, the oscillation of the lens barrel 134 may occur depending on a variation in the friction coefficient between the guide groove 131a/131b/132a (FIG. 1) guiding the lens barrel 134 and the ball bearing 141/142/143 (FIG. 1) contacting the guide groove 131a/131b/132a.

Lubricant containing grease may be applied to the ball bearing 141/142/143 and the guide groove 131a/131b/132a. For example, the variation of the friction coefficient between the ball bearing 141/142/143 and the guide groove 131a/131b/132a may occur depending on the variation of the lubricant applied to the ball bearing 141/142/143 and the guide groove 131a/131b/132a. Variations in lubricant may occur depending on the quantity of lubricant applied in the initial process or the reduction of the lubricant according to use.

According to an example, the controller IC 214 may determine the control gains depending on the variation of the friction coefficient, to suppress oscillation of the lens barrel 134, and may move the lens barrel 134 to a target position quickly.

Figure 4:
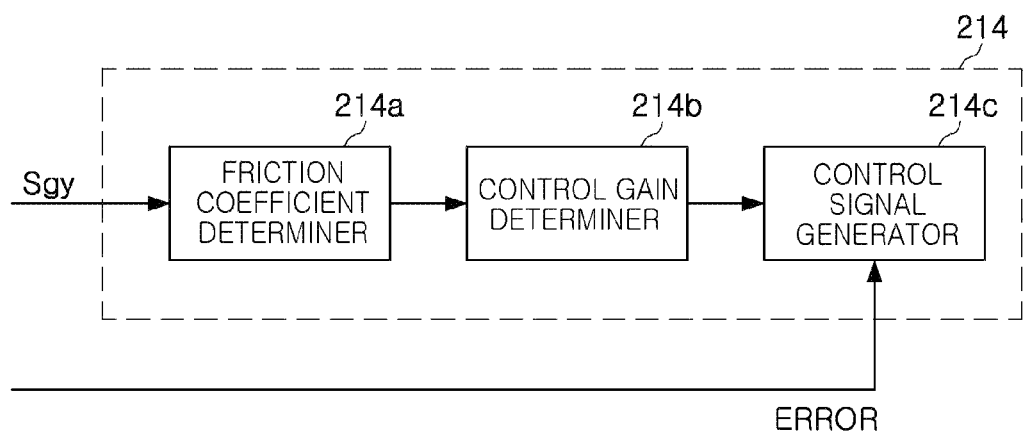
FIG. 4 is a block diagram of a controller IC according to an example.

FIG. 4 is a block diagram of the controller IC 214, according to an example.

Referring to FIG. 4, the controller IC 214 may include a friction coefficient determiner 214a, a control gain determiner 214b, and a control signal generator 214c.

The friction coefficient determiner 214a may determine a friction coefficient between the ball bearing 141/142/143 and the guide groove 131a/131b/132a. The friction coefficient determiner 214a may control the driving circuit 216 to provide a detection signal to the driving coil 220.

The friction coefficient determiner 214a may determine a friction coefficient between the ball bearing 141/142/143 and the guide groove 131a/131b/132a according to the level of the detection signal measured at the time when the lens barrel 134 overcomes the static friction force and moves. In this case, the level of the detection signal corresponds to a current level or a voltage level. The movement of the lens barrel 134 may be measured from the position detector 240 including a Hall element that detects the position of the lens barrel 134.

The level of the detection signal may be increased gradually or linearly. The level of the detection signal may be increased from a preset reference level. In this case, the preset reference level may correspond to a zero level.

The friction coefficient determiner 214a may determine the friction coefficient by modeling the level of the detection signal at the time when the lens barrel 134 overcomes the static friction force and moves, as the static friction force.

Since the static friction force is proportional to the friction coefficient and the normal force, in a case in which it is assumed that the normal force is constant, when the level of the detection signal at the time the lens barrel 134 is moved is modeled as the static friction force, the friction coefficient between the ball bearing 141/142/143 and the guide groove 131a/131b/132a may be determined.

On the other hand, since the normal force is changed depending on the angle of the guide groove 131a/131b/132a contacting the ball bearing 141/142/143, the friction coefficient determined according to the level of the detection signal at the time the lens barrel 134 moves needs to be corrected according to the angle information of the guide groove 131a/131b/132a.

The friction coefficient determiner 214a may receive a gyro signal Sgy including angle information of the guide groove 131a/131b/132a. The gyro signal Sgy may be provided from a gyro sensor that detects shaking of a camera module 100 or an electronic device including the camera module 100.

Since the gyro sensor detects acceleration and angular velocity of the camera module 100 or an electronic device including the camera module 100, the gyro signal Sgy output from the gyro sensor may include angle information of the guide groove 131a/131b/132a. Accordingly, the friction coefficient determiner 214a may correct the friction coefficient according to the angle information of the guide groove 131a/131b/132a provided from the gyro signal Sgy.

The control gain determiner 214b may determine the control gains according to the friction coefficient determined by the friction coefficient determiner 214a. For example, the control gain determiner 214b may increase the level of the control gains when the friction coefficient is greater than a reference friction coefficient, and may decrease the level of the control gains when the friction coefficient is less than the reference friction coefficient.

The control signal generator 214c may generate a control signal by applying the control gains determined by the control gain determiner 214b to the error value ERROR.

The lens barrel 134 may be quickly moved to the target position without oscillation by the control signal generated by the control signal generator 214c.

As set forth above, according to embodiments disclosed herein, the control gains are determined according to a friction coefficient between a guide groove for guiding the movement of a lens barrel and a ball bearing in contact with the guide groove, thereby suppressing oscillation of the lens barrel, and quickly moving the lens barrel to a target position.

The position detector 240, the comparer 212, the controller IC 214, the coefficient determiner 214a, the control gain determiner 214b, and the control signal generator 214c in FIGS. 2 to 4 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. In addition, respective embodiments may be combined with each other. For example, the pressing members disclosed in the above-described embodiments may be used in combination with each other in one force sensing device. Therefore, the scope of the disclosure is defined not by the detailed description, but by the claims and their equivalents, and all variations within the scope of the claims and their equivalents are to be construed as being included in the disclosure.

What is claimed is:

1. An actuator of a camera module, comprising:
   a magnet disposed on a lens barrel;
   a driving coil disposed opposite to the magnet; and
   a driving device including a comparer configured to calculate an error value by comparing a target position of the lens barrel with a current position of the lens barrel, a controller IC configured to generate a control signal by applying control gains to the error value, and a driving circuit configured to generate a driving signal in response to the control signal,
   wherein the controller IC is further configured to determine the control gains based on a friction coefficient between a guide groove guiding movement of the lens barrel and a ball bearing contacting the guide groove, and
   wherein the controller IC is further configured to provide a detection signal having a gradually increasing level to the driving coil, and determine the friction coefficient based on a level of the detection signal at a point in time of movement of the lens barrel.

2. The actuator of claim 1, wherein the control gains are provided by a PID controller.

3. The actuator of claim 2, wherein the controller IC is further configured to increase the control gains in response to the friction coefficient being greater than a reference friction coefficient, and decrease the control gains in response to the friction coefficient being less than the reference friction coefficient.

4. The actuator of claim 1, wherein the controller IC is further configured to receive a gyro signal including angle information of the guide groove.

5. The actuator of claim 4, wherein the controller IC is further configured to correct the friction coefficient based on the angle information of the guide groove.

6. The actuator of claim 1, further comprising a position detector including a Hall element configured to detect a position of the lens barrel.

7. The actuator of claim 1, wherein the guide groove and the ball bearing are configured to have a lubricant applied thereto.

8. The actuator of claim 1, wherein the controller IC is further configured to model the level of the detection signal at the point in time of movement of the lens barrel, as static friction.

9. The actuator of claim 1, wherein the driving circuit is further configured to provide the driving signal to the driving coil to perform either one of moving the lens barrel in an optical axis direction for an autofocus function and moving the lens barrel in a direction perpendicular to the optical axis direction for an image stabilization function.

10. An actuator of a camera module, comprising:
a magnet disposed on a lens barrel;
a driving coil disposed opposite to the magnet; and
a driving device including a comparison unit configured to calculate an error value by comparing a target position of the lens barrel with a current position of the lens barrel, a controller IC configured to generate a control signal by applying control gains to the error value, and a driving circuit configured to generate a driving signal in response to the control signal to move the lens barrel to the target position,
wherein the controller IC is further configured to determine the control gains based on a friction coefficient between a guide groove guiding movement of the lens barrel and a ball bearing contacting the guide groove, and
wherein the controller IC is further configured to provide a detection signal to the driving coil, and model a level of the detection signal at a point in time of movement of the lens barrel, as a static friction force, to determine the friction coefficient.

11. The actuator of claim 10, wherein the control gains are provided by a PID controller.

12. The actuator of claim 11, wherein the controller IC is further configured to increase the control gains in response to the friction coefficient being greater than a reference friction coefficient, and decrease the control gains in response to the friction coefficient being less than the reference friction coefficient.

13. The actuator of claim 10, wherein the controller IC is further configured to receive a gyro signal including angle information of the guide groove.

14. The actuator of claim 13, wherein the controller IC is further configured to correct the friction coefficient based on the angle information of the guide groove.

15. The actuator of claim 10, further comprising a position detector including a Hall element configured to detect a position of the lens barrel.

16. The actuator of claim 10, wherein the guide groove and the ball bearing are configured to have a lubricant applied thereto.

17. The actuator of claim 10, wherein the detection signal has a gradually increasing level.

18. The actuator of claim 10, wherein the driving circuit is further configured to provide the driving signal to the driving coil to perform either one of moving the lens barrel in an optical axis direction for an autofocus function and moving the lens barrel in a direction perpendicular to the optical axis direction for an image stabilization function.

* * * * *